United States Patent Office 3,798,186
Patented Mar. 19, 1974

3,798,186
COMPOSITION FOR PLUGGING FORMATIONS HAVING PORES IN CONSTRUCTIVE WORKS
Sadao Nakade, Itami, and Hirosuke Kubota, Toshiyuki Oshita, and Kuniyoshi Sakane, Osaka, Japan, assignors to Kabushiki Kaisha Takenaka Komuten, Osaka-shi, Japan
No Drawing. Original application Mar. 20, 1969, Ser. No. 808,865, now Patent No. 3,623,330. Divided and this application May 11, 1971, Ser. No. 142,376
Claims priority, application Japan, Mar. 21, 1968, 43/18,635; July 13, 1968, 43/49,492; Nov. 16, 1968, 43/83,940
Int. Cl. C08g 41/04
U.S. Cl. 260—2.5 A
7 Claims

ABSTRACT OF THE DISCLOSURE

This invention relates to composition for plugging formations in civil engineering and construction, reinforced underground structure and underground structure required for strengthening the ground thereof, which may be effectively utilized in plugging or in strengthening unstable ground in sealing-off points of water leakage or oil leakage in civil engineering and construction, in preventing gas leaks in soils or in construction, or in increasing bearing capacities of pull-out or push-in piles to be constructed.

Thus, the invention is intended to provide a composition for plugging formations having interstices and a composition for compacting formations by filling interstices with a solidified substance and also provide a reinforced ground structure and an undergound structure for reinforcing the ground, characterized in that a fluidal substance, such as an isocyanate compound, which upon coming into contact with water, reacts thereby to produce water-insoluble solidified substance and liberating a gas, is forced to be present in the interstices in formations such as water leakage regions in civil engineering and construction and a ground or weak ground where water leakage or water seepage is expected, so that it reacts with the water and the resulting insoluble solidified substance is allowed to be intimately bonded to the surfaces of the interstices under the pressure of the liberated gas, thereby sealing-off the interstices easily and effectively.

This application is a divisional application of Ser. No. 808,865, filed Mar. 20, 1969, now U.S. Pat. No. 3,623,330.

BACKGROUND OF THE INVENTION (1) In conventional soil stabilization methods by chemical injection, a chemical liquid obtained by mixing two or more than two reacting chemical components just before injection is injected into the ground, first to replace interstice water in the ground with the chemical mixture, and then, with the interreactions between different chemical components, water-insoluble solid substances are formed within the interstices between soil particles for the purpose of shutting-off water or strengthening of soil. However, in such a method each chemical component in the chemical mixture starts a continuous "liquid to solid" transformation at the moment when different chemical components are mixed together, so this solidification takes place with no consideration of time required for the chemical mixture to flow through injection equipment to the expected ground, therefore, in case the speed of solidification of the chemical liquid is high, it is almost impossible to avoid difficulties, due to rapid increase in viscosity, often causing gelation of chemical or plugging near the outlet of injection pipe with reaction product preventing permeation of unreacted liquid, and thus, this method is defective because of the injection being impossible.

On the other hand, in case when solidification is slow, though it is possible to control increase of viscosity in the injection equipment, even after the chemical reaches the expected location within the ground, the fluidity of said liquid still remains and its concentration will be diluted with water contained in the ground, thereby further delaying the solidification, and on occasion, the chemical is carried away from the objective ground location to other places by underground water resulting in the complete failure of the injection purpose.

In other words, the chemical liquid, used in the conventional method, internally comprised two fundamentally contradicting characteristics, one of which is "characteristics requiring maintaining of good fluidity," and the other "that of rapid solidification."

As to this mutual contradiction, the only known controlling method of solidification speed of the chemical liquid was an extremely passive step, that is, to control the speed of chemical reaction along the time-viscosity increasing curve which changes in a specific shape in which the increase of viscosity is kept as low as possible during initial period of injection but will rapidly increase after a certain period of time. However, the speed of chemical reaction is always influenced by surrounding temperature, concentration of chemicals, ratio of chemical components, etc. and to control is not only difficult but the every sort of complication accompanying by an actual performance, such as the necessity of selection of the optimum speed of consolidation due to consideration of ground conditions, capacity of the injection equipment, degrees of workmen's experiences, etc. is the greatest cause of the unstability in the result of injection work.

That is to say, such a complicated method requiring highly technical experiences cannot be considered suitable to everybody. In fact, there were many actual cases which had ended in failure by performing works at invisible locations with accuracy. Further, this method cannot be considered suitable for field works where the working conditions are not perfect in the usual cases.

(2) Also, in underground structure, such as basement or tunnels, leakage of ground water may occur through cracks in concrete wall or lining. Conventionally, shutting-off of water at such locations has been performed by sealing-off cracks with chemical liquid similar to those referred to above in similar manner already mentioned. Such methods also had defects similar to those referred to in (1). Supposing that solidification of chemical liquid in cracks was obtained, it would still be impossible to avoid the water between solidified substance and surface of crack, and this remaining water will cause imperfect contact between the solidified substance and the surface of crack, and also the permeation of the said water within the said solidified substance will decrease the strength of it by the softening phenomena thereby making perfect shut-off of water impossible.

(3) In the cases where underground anchors are constructed in civil engineering and construction, it is usually done by excavating in advance and constructing concrete anchoring structure, or by boring holes in the ground and putting cement mortar together with anchor rods therein, thereby increasing ground stability; however, excavation or boring require large scale equipments, and in case neighboring structure is very close to such equipments when the job site is limited, such methods become impractical.

Further, excavation or boring require great amount of labor and time, and moreover, concrete or cement mortar require a considerable time before they attain the required strengths, and such methods cannot be employed in cases where a landslide of retaining walls or cut-slope is foreseen and urgent reinforcement is required.

In addition, in cases where the amount of ground water was great, or where underground stream was existing at the site of anchoring structure, not only the construction required great amounts of labor and time, but also it was impossible to obtain the intended strength.

It is possible to offer a method of constructing underground anchor employing a method of chemical injection method which is later described herein, as a method for constructing anchor in the ground solving aforementioned difficulties inexpensively as well as rationally; however, within the scope of conventional chemical injection methods, the application for said purpose was found impossible due to the limited capability of the chemicals thereof.

(4) Moreover, in the conventional chemical injection method used for soil stabilization the consolidated lumps of earth formed by the permeation of injected chemical were spherical or cylindrical in shape around the outlet ends of chemical injection pipes and were solid substance homogeneous in cross-section; but they do not necessarily have to be solid homogeneous lumps of earth in cross-section for it will be more rational and economical that they become cells of earth whose peripheral surfaces only are solidified while interiorly unsolidified. Furthermore, concrete explanation for this will be given later; but in conventional chemical injection methods it was almost impossible to produce a cell-form or shell-form lumps of earth. Supposing it was possible to produce a cell-form or shell-form lumps of earth, their mechanical strength would be so low that they would be of no practical use.

SUMMARY OF THE INVENTION

This invention, as aforementioned, has been developed through a research to improve the fundamental defects of the conventional chemical injection method, and the main technical idea of the invention is very original and is characterized by the use of chemical liquid substance mainly comprising, for example, isocyanate group compound which upon coming into contact with water will start chemical reaction where a water-insoluble solid substance is produced and gas is liberated.

In addition, the present invention may develop the most preferable effectiveness in the easiest-to-use condition in the following manner. Thus, upon coming into contact with water in the interstices present in the texture of the ground or constructions, a mixed fluid consisting of an isocyanate compound and a silane compound is caused to react with said water and the reaction product which is water-insoluble is employed to plug the interstices while utilizing the reaction-produced gas, thereby forming a solid substance in the intended interstices, thus intertexture interstice-plugging, such as water-sealing, gas-sealing and oil-sealing in civil engineering and construction, improvement of the ground, formation of bulbs at the front ends of piles, etc. can be effected in the easiest-to-practice condition and decidely favorable effectiveness can be obtained.

These may be attributed to the following reasons. In case where an isocyanate compound liquid of relatively high molecular weight is used, the reaction product thereof with water is highly tenacious and a solid of high mechanical strength is obtained, there being no toxic property attributable to the volatile matter. Further, the invention has many advantages associated with the objects thereof, including easiness to obtain a solid having a high content of isocyanate which is an active group, but this isocyanate compound has only one disadvantage that it has relatively high viscosity to the extent that it exerts a high resistance to penetration into intertexture interstices and is rather difficult to inject.

The invention uses a mixed fluidic substance consisting of an isocyanate compound and derivative of silane compound, thus resulting in the remarkable advantage that the silane derivative acts as a solvent for isocyanate compounds and reduces the viscosity, thereby making penetration into interstices easier. Moreover, this silane derivative, though being a mere diluent, undergoes hydrolysis as in the isocyanate compound to form a water-insoluble reaction product to assist in plugging the pores and, fortunately, the reaction product from the hydrolysis of the silane derivative, though brittle when alone, is capable of forming a solid having extremely high tenacity and high compression strength when it coexists with the formed gel obtained by the reaction of the silane derivative with water; thus, the invention has made possible the firm sealing of interstices, improvement of the ground, formation of bulbs at the front ends of piles, etc. In addition, in case where a mixed fluid according to the invention is used, the chemical starts a reaction quickly in the manner of a chain reaction upon meeting with water, so that the solid can be conveniently quickly formed without being washed away with torrential underground water. That is to say, the yielding of a reactive hydrogen-containing alcohol easy to combine with the isocyanate compound in the process of the hydrolysis of the silane derivative to form a silicate gel results in the advantage of quickly forming a solid. Details thereof will later be given in embodiment 3. The above is the optimum method of the present invention, but as it is also possible to use an isocyanate compound alone, the basic concept of the invention will be fully described below followed by the description of various modes of the embodiment, function and effectiveness, and other features of the invention.

The points at which this invention fundamentally differs from the conventional method in both theory and practice are as follows.

(a) Not only does the chemical itself not produce any solidified substance unless it meets moisture, but also whenever the unreacted substance in the fluidal substance of the invention meets moisture it forms a solidified substance.

(b) The most advantageous feature of the invention resides in the use of a fluidal substance which will liberate a gas simultaneously with the formation of a solidified substance. The gas pressure facilitates the automatic advance and penetration of the present chemical into the required position. Further, said solidified substance is caused to firmly bond to part or the whole of the surface defining the interstice, thereby achieving the shutting-off of water and oil and the prevention of gas leakage, and the fluidal substance or solidified substance is urged into the interstices under the gas pressure to effect complete plugging. These are the greatest merits of the invention.

(c) And, the fluidal substance which must be solidified by reacting with water in this invention has good fluidity until it encounters with water. Therefore it will easily permeate into voids or interstices of formation of the injected location in the ground.

(d) If there is water, it will produce substance without causing difficulty in an imperfect reaction due to dilution by water itself. Liberated gas temporarily expels excessive ground water. An effective area of the solidification in this method is broadly extended by means of the bubble of the gas.

(e) Changing into a form which cannot be carried away by water, filling the voids or interstices of the formation assuring the action of shutting-off water or oil, preventing gas leakage and strengthening of ground in good efficiency.

(f) Furthermore, the work is very easy for there is no difficulty in controlling of solidification speed.

(g) In other words, the fluidal substance employed in this invention automatically reacts at locations where shutting-off of water or where strengthening is required, i.e. since this chemical automatically selects and reacts at water bearing ground or at the location of water leakage, desired work can be performed inexpensively and rationally without requiring the highly technical experiences which were necessary in conventional methods.

Therefore, it is no exaggeration to say that in this invention the skilled techniques formerly required for chemical injection method is no longer necessary. Also, only a very simple injection equipment is sufficient for the work and nearly no experience in the performance of work is required.

For example, as to the stabilization of a relatively shallow ground where the prevention of water leakage at sheet pile retaining walls in underground excavation, prevention of water leakage in tunnel excavation, prevention of rupture at tunnel facing work, rapid solidification due to mixing with muddy soil, etc. can be achieved, it is possible to stabilize the ground promptly by concentrated injections in selected regions either by the use of a piston-type manual pump or simple injection syringe-type plunger pump or by sprinkling the chemical for mixing.

The invention has the following objects included in its objects. Further, the advantage that these objects can be achieved is included in the advantages of the invention.

(1) This invention does not require the complicated and tiresome controlling of the speed of solidification of the chemical liquid which was necessary in the conventional method; and it is intended to obtain a simple, easy, and sure method in sealing-off voids or interstices in the formations.

(2) It is an object of the invention to seal-off water leakage or oil leakage in the ground, to prevent gas leakage through interstices in textures, e.g. gas leakage during the digging of natural gas wells or petroleum gas wells.

(3) It is also an object of the invention to provide an effective method for shutting-off water leakage through cracks in structures or interstices in formation.

(4) To obtain a reinforced subgrade is also one of the objects of this invention.

(5) To construct underground structure with the object of reinforcing the ground is also one of the objects of this invention.

(6) Another object of this invention is to provide a pile construction method which can be very effectively utilized without being influenced by the presence of ground water, for instance, as in pile structures such as anchor-rods and bearing piles with pull-out or push-in resistance to the ground.

(7) It is also an object of the invention to provide a technique for causing a reaction-produced solidified substance to be firmly bonded to the surface of a substance whose interstices are to be closed, for the purpose of achieving the above-mentioned objects (1), (2) and (3).

(8) It is intended to obtain a method for increasing the efficiency of the effective area of the solidification of the fluidal substance injected into the ground or structure by greatly enlarging the region where the fluidal substance used effectively solidifies.

(9) It is also an object of the invention to provide a construction work method which can be easily and efficiently applied to obtain an underground water shutting-off wall composed of shell-like consolidated lumps of earth or a ground which is reinforced by shell-like lumps of earth.

DESCRIPTION OF THE PREFERRED EMBODIMENTS

EMBODIMENT 1

An example of the chemical fluid which can be most effectively used in this invention method may be said to be an isocyanate compound which is expressed in the general formula $R-(NCO)_n$ or another group of isocyanate compounds obtained by the reaction between said isocyanate compounds and other compounds containing active hydrogen and remaining reactive with water. These compounds can easily polymerize with underground water to form a water insoluble high polymer substance which liberates carbon dioxide gas.

Where: R is an organic group such as of either an aliphatic or aromatic family or both, $n$ is an integer of 2 or more.

So they are polyisocyanates of aliphatic or aromatic family such as: 2,4-tolylene diisocyanate, 2,6-tolylene diisocyanate, mixture of 2,4- and 2,6-tolylene diisocyanate, crude tolylene diisocyanate, diphenylmethane-4,4'-diisocyanate, polyallylene polyisocyanate, n-phenylene diisocyanates, hexamethylene-1,6-diisocyanate, o-, m- and p-xylene diisocyanates, methylene-bis-p-phenylene diisocyanate, and polyallylene polyphenyl isocyanate; and prepolymers containing an isocyanate-terminated group produced by the reactions of excess of these polyisocyanates (i.e., those listed at the beginning of this sentence) with compounds containing active hydrogen.

As for the compounds containing active hydrogen employed for the production of said prepolymers, mention may be made of water, alcohols, organic acids, amines, etc.; but as for the alcohols, those dihydric or other polyhydric alcohols are desirable, and such low molecular weight polyhydric alcohols as ethylene glycol, propylene glycol, diethylene glycol, glycerine, trimethylol ethane, trimethylol propane and pentaerythritol, together with castor oil and its derivatives, hydroxyl-group-terminated polyethers and polyesters are also to be included.

The said hydroxyl-group-terminated polyethers are the addition-polymerization products between the low molecular weight compounds containing active hydrogen and alkylene oxides, and in this case it is desirable to choose low molecular weight compounds containing 2 or more active hydrogen atoms per each molecule. And, as practical examples or such polyethers, mention may be made of the reaction products between one or any more members of active-hydrogen-containing low molecular compound group of water, ethylene glycol, propylene glycol, glycerine, trimethylol propane, sorbitol, saccharose, phosphorous acid, orthophosphoric acid, derivatives of phosphoric acid for instance, glycero-phosphoric acid, ammonia, ethylene diamine, diethylene triamine, ethylene amine, etc., and one or more members of alkylene oxide group of ethylene oxide, propylene oxide, 2,3-butylene oxide, tetrahydrofuran, epichlorohydrine, styrene oxide, etc.

Among the hydroxyl group-terminated polyesters, the products obtained by the reaction between organic polybasic acids and an excess of polyhydric alcohols are taken up, in this case, as for the organic polybasic acid, there are oxalic acid, succinic acid, adipic acid, azeloic acid, sebacic acid, maleic acid, fumaric acid, phthalic anhydride, isophthalic acid, terephthalic acid, tetrachloropthalic acid, trimellitic acid, etc., and as for polyhydric alcohols there are ethylene glycol, propylene glycol, diethylene glycol, dipropylene glycol, 1,3-butylene glycol, 1,4-butylene glycol, neopentyl glycol, 1,6-hexanediol, 1,3,6-hexanetriol, glycerine, trimethylol propane, trimethylol ethane, pentaerythritol, sorbitol and mixtures thereof. The polyesters may be modified by the addition of a small amount of organic monobasic acids and monohydric alcohols. Further, the hydroxyl-group-terminated polyesters produced by the polymerization of oxy-acids and those lactonic compounds are also useful. As to the organic acids, besides all the organic acids which are used for said hydroxyl-group-terminated polyesters, hydroxyl-group-terminated polyesters which are produced from said organic acids and raw materials for the production of said hydroxyl-group-terminated polyethers can also be utilized.

As for the amines, all those containing primary or secondary amines within their molecules are usable. Mention may be made of ammonia, methyl amine, hydrazine, ethylene diamine, diethylene triamine, and amine-terminated polyamides, however, isocyanate-terminated prepolymer which are produced from amines and an excess of polyisocyanate generally lack stability to be stored and so they are not useful.

The isocyanate compound to be used in this invention is preferably to be in a liquid state, however, even if it where a solid in itself which dissolves into solvent to be diluted or changes to liquid state by diffusion under the conditions of employment, then it will serve the purpose just as well. Further, it is possible to adjust the viscosity of said liquid by suitably using solvents according to the condition of the soil to be injected at the site in order to maintain necessary viscosity for the work. Generally, the suitable viscosity is 1–2000 cps., the desirable content of the isocyanate group being 2% or more. The solvents used are those which have no groups reactive with the isocyanate group and which contain no water, including aromatic hydrocarbons, aliphatic hydrocarbons, ketones, esters, ethers and alkylhalides. As for practical examples thereof, mention may be made of benzene, toluene, xylene, acetone, methyl-ethyl ketone, ethyl acetate, butyl acetate, cellosolve acetate, trichloroethylene, dichloromethane, dichlorobenzene, etc.

When the isocyanate compound reacts with water contained in the ground, for the adjusting of the reaction a suitable amount of catalysts and crosslinking agents may be added. As for the catalysts, any suitable catalyst which accelerates the reaction of known isocyanates with compounds containing active hydrogen may be used. For instance, mention may be made of triethylamine, N-methylmorpholine, N-ethylmorpholine, N-cocomorpholine, dimethyl-benzyl amine, triethylene diamine, N,N'-dimethyl-2-methylpiperazine, pentamethyl-diethylene triamine, etc. of the tertiary amines, or stannous chloride, dibutyl tin dilaurate, dibutyl tin oxide, stannous octate and other organo-tin compounds. These catalysts may be used as mixtures thereof or may be suitable diluted with solvent and allowed to penetrate into sites where the invention is applied, for example, into the ground beforehand. Further, to improve the contact of said isocyanate compounds with water and thereby allowing their reaction to proceed uniformly or to control the stability of the liberated carbon dioxide gas bubbles, surface active agents may be added to the isocyanate compounds beforehand. Particularly useful surface active agents are silicone-type non-ionic ones, which are useful in producing the well-known urethane foam.

When additives such as mentioned above are added to said isocyanate compounds as may be required, and as the said isocyanate compound is injected into the ground, it will start the polymerizing reaction at the instant it comes in contact with ground water to produce water-insoluble gel-form high polymer solid substance within the slits or interstices or between soil particles, without the accompanying defects such as in the conventional method which has been pointed out in (1) through (4) of the foregoing "Background of the Invention" resulting in an instantly effective stabilization of the ground.

The isocyanate compound generally liberates carbon dioxide gas when it comes in contact with water. The carbon dioxide gas thus liberated temporarily expels excessive water in the vicinity of stabilizing parts of the ground during the process, and at the same time it leads to the benefits as described in the "Summary of the Invention" before.

The description of the fruits obtained in the experiments of said invention of chemical injection methods are given below:

EXPERIMENT 1

By preparing a model ground consisting of a sand layer in which the hydraulic gradient can be freely controlled, and therewith comparison were made between the experiments for four kinds of representative grouts of water-soluble chemical fluids available on the market, meeting the conditions shown in the attached Table 1. The isocyanate-type prepolymer used in said experiment consisted of 70 parts in weight of 2 functional urethane prepolymer of polypropylene glycol-tolylene diisocyanate, cut back with 30 parts in weight of xylene solvent, and into which silicone surface active agent of 0.1% in total weight and triethylamine of 0.5% as catalyst were added.

TABLE 1.—CONDITION FOR EXPERIMENT

| Item | Test 1 | Test 2 | Test 3 |
|---|---|---|---|
| Grain size of soil sample, mm | 0.3–0.6 | 0.6–1.2 | 1.2–2.5 |
| Porosity of soil sample, percent | 40 | 38 | 37.5 |
| Hydraulic gradient | 1.5 | 1.5 | 1.5 |
| Apparent velocity of water flow, mm./sec | 0.600 | 0.747 | 0.800 |
| True velocity of water flow, mm./sec | 1.50 | 1.965 | 2.130 |
| Coefficient of water permeability of soil sample, cm./sec | $4.00 \times 10^{-2}$ | $4.98 \times 10^{-2}$ | $5.83 \times 10^{-2}$ |
| Quantity of injection grout, ml | 300 | 300 | 300 |
| Injection pressure, kg./cm.$^2$ | 0.5 | 0.5 | 0.0 |
| Injection time, sec | 20–40 | 20–40 | 20–45 |
| Gel time, sec | 60±5 | 60±5 | 60±5 |

The results of the experiments are as shown in Tables 2–6 inclusive, and the isocyanate-type prepolymer of this invention showed very effective consolidation results for the model ground with severe underground stream.

TABLE 2.—RESULTS OF THE TEST 1

| Type of grout used | Consolidated volume (cm.$^3$) | (Consolidated volume/injected qty. of grout)×100 (percent) | Injection efficiency: (void vol./injected qty. of grout)×100 (percent) |
|---|---|---|---|
| Isocyanate-type prepolymer | 1,887 | 629.0 | 251.6 |
| Acrylic amide type | 572 | 124.0 | 49.6 |
| Water glass type | 515 | 171.7 | 68.7 |
| Urea-formaldehyde type | 402 | 134.0 | 53.6 |
| Chrome-lignin type | 460 | 153.3 | 61.3 |

TABLE 3.—RESULTS OF THE TEST 2

| Type of grout used | Consolidated volume (cm.$^3$) | (Consolidated volume/injected qty. of grout)×100 (percent) | Injection efficiency: (void vol./injected qty. of grout)×100 (percent) |
|---|---|---|---|
| Isocyanate-type prepolymer | 1,860 | 620.0 | 235.6 |
| Acrylic amide type | 279 | 93.0 | 35.0 |
| Water glass type | 181 | 60.3 | 22.9 |
| Urea-formaldehyde type | 86 | 28.7 | 10.9 |
| Chrome-lignin type | 120 | 40.0 | 14.9 |

TABLE 4.—RESULTS OF THE TEST 3

| Type of grout used | Consolidated volume (cm.$^3$) | (Consolidated volume/injected qty. of grout)×100 (percent) | Injection efficiency: (void vol./injected qty. of grout)×100 (percent) |
|---|---|---|---|
| Isocyanate-type prepolymer | 1,560 | 520.0 | 197.6 |
| Acrylic amide type | 565 | 183.3 | 71.6 |
| Water glass type | 330 | 110.0 | 41.8 |
| Urea-formaldehyde type | 295 | 98.3 | 37.7 |
| Chrome-lignin type | 295 | 98.3 | 37.7 |

EXPERIMENT 2

By preparing a model ground formation of a sandwich-type in which a layer of sieved sand with grain size of 0.6–1.2 mm. is held between two upper and lower impermeable clay layers, comparative experiments were made therewith for the effect of sealing water at the sand layer for 4 kinds of representative grout of water-soluble chemical liquids available on the market, meeting the condition of water flow system shown in the attached Table 5 and those for the isocyanate-type prepolymer of this invention. The isocyanate-type prepolymer used in said experiment consisted of 70 parts in weight of 2 functional urethane prepolymer from tolylene diisocyanate polypropylene glycol, cut back by adding 10 parts in weight of acetone and 20 parts in weight of xylene, into which triethylene diamine of 0.2% of the total weight is added as catalyst.

TABLE 5.—CONDITIONS FOR EXPERIMENT

Porosity of soil sample: 38%
Hydraulic gradient: 3.0
Apparent velocity of water flow: 1.39 mm./sec.
True velocity of water flow: 3.66 mm./sec.
Injection method: One shot method
Quantity of injected grout: 600 ml.
Injection pressure: 0.5 kg./cm.²
Injection time: 15–30 sec.
Gel time: 45 sec.

The results of the experiment are as shown in Table 6, and the isocyanate-type prepolymer of this invention especially was the only case where the extent of consolidation showed capability of completely shutting-off flowing water and showing an efficiency of shut-off water of 100%.

TABLE 6.—RESULT OF WATER SHUT-OFF EXPERIMENT

| Type of grout used | Consolidated volume (cm.³) | (Consolidated volume/Injected qty. of grout) ×100 (percent) | Injection efficiency: (void vol./Injected qty. of grout) ×100 (percent) | Efficiency of shut-off water¹ (percent) |
|---|---|---|---|---|
| Isocyanate-type prepolymer | 4,750 | 7,917 | 300.8 | 100 |
| Acrylic amide type | Flowed away | | | |
| Water glass type | Flowed away | | | |
| Urea-formaldehyde type | 760 | 126.7 | 48.1 | 7.15 |
| Chrome-lignin type | 555 | 92.5 | 35.2 | 14.7 |

¹ Efficiency of shut-off water = $\frac{a-b}{a} \times 100$ where: a=water flow rate before injection; b=water flow rate after injection.

If, as the gas-liberating substance, use is made especially of a metal carbide in the form of very fine powder, this is advantageous since the carbide itself forms a water-insoluble substance; such embodiment is shown as follows.

EMBODIMENT 2

The liquid substance which comprises a derivative of silane compound expressed by the general formula $$R_n\text{-Si-X}_{(4+n)}$$

and a small amount of fine metallic carbide suspended in said silane derivative can be applied to this invention, wherein said liquid silane derivative reacts with water to hydrolyze under the normal temperature to produce water-insoluble gel-like silicone compound and said fine metallic carbide liberates hydrocarbon gas in contact with water.

In this case R is an organic group of alkyl or aryl radical, and X is an alkoxy group or halogen atom.

In general, the less carbon atoms R contains, the faster it hydrolyzes and the more its fluidity increases, therefore, it may be effectively applied to this invention.

In case X is a halogen atom, its usage is confined to the cases in which the corrosive effect in order to liberate hydrogen halide may be ignored.

When X is an alkoxy group it is relatively cheap in cost and does not liberate any substance with corrosive property while it generally has a defect which is slow in hydrolysis. It is necessary, therefore, to take into consideration to accelerate the hydrolysis.

It will be effectively accelerated by mixing a small amount of organic acid, or a suitable amount of alcohol in which sodium alcoholate is solved.

Those which are applied to the most practical usage are alkoxysilanes such as tetra-methoxy silane, tetra-ethoxy silane, etc. Those which are crude products containing little remainder of hydrochloric acid are rather cheap and speedy in hydrolysis than the refined products, so they are suitable to practice.

As the fine metallic carbide compounds suspending in the fluid mentioned above, calcium carbide or magnesium carbide, etc., reacting with water to produce acetylene gas, may be used among other metallic carbides.

When much gas foam is desired according to the purpose, it will be achieved by increasing the quantity of these fine metallic carbides suspended in the fluid.

In this case, the addition of carbide which hydrolyzes to produce calcium hydroxide, has an effect to accelerate the hydrolysis of the said silane derivative on account of its alkalinity.

EMBODIMENT 3

A solution prepared by adding a derivative of silane, expressed by the general formula $R_n\text{-Si-R}'_{(4-n)}$ (where R' is other than halogens) described in Embodiment 2 to an isocyanate compound expressed by the general formula $R\text{-(NCO)}_n$ described in Embodiment 1 or another isocyanate obtained by the reaction of the first-mentioned isocyanate with an active hydrogen-containing compound, may be used as a chemical fluid suitable for the objects of the invention. In this case, since the isocyanate compound and also the silane derivative react with water to form water-insoluble solid gels and possess mutual solubility, it is possible to provide various merits by using the latter as a reactive diluent for the former. For example, an isocyanate pre-polymer containing an isocyanate group at the end thereof prepared by the reaction between active hydrogen-containing compound and an excess of polyisocyanate containing an organic radical of aromatic or aliphatic group is advantageous in that it has superior mechanical properties and there is included, no isocyanate compound toxic to the human body, but is disadvantageous in that most of such isocyanate prepolymers are highly viscous so that their penetrability into the interstices in the ground and constructions is inferior. For this reason it is necessary to prepare cut backs with various organic solvents as described in Embodiment 1 in order to reduce the viscosity, but in this case a decrease in the effective component concentration is unavoidable. In such case, if alkoxy silane compounds such as tetraethoxy silane, tetramethoxy silane, dimethoxy silane and dipropoxy silane are used as solvents for cut backs, these solvents will undergo hydrolysis when they come into contact with water to form silicate gels, therefore, they can be employed more effectively as chemical fluids having a high concentration of useful solid component, suited for the objects of the invention.

Further, such alkoxy silane compound will yield alcohol upon hydrolysis, resulting in the merit of further promoting the reaction of the chemical fluid into a solid since said alcohol contains active hydrogen and hence reacts with the isocyanate prepolymer. Such chemical fluid consisting of an isocyanate prepolymer cut back by the alkoxy silane compound which is capable of hydrolysis as described above is low in viscosity and superior in penetrability and yet high in the concentration of the useful solid component and the gel produced by reaction with underground water while it is attended by the formation of gas bubbles comprises inorganic silicate gel present within the polyurethane, so that there is obtained a gel of very high mechanical strength. Further, the use of alkoxy silane less expensive than isocyanate prepolymer will achieve better economy without the performance of the chemical liquid being degraded; rather, it is improved.

If the solvent cut rate by an organic silane compound with respect to the aforesaid isocyanate compound is increased, the effectiveness of gas-bubbling upon reaction with underground water is lowered, but in practice 5 to 80% will be effective. Further, for a catalyst for promoting reaction with water in this case, all the tertiary amines or organic metal compounds described in Embodiment 1 can be used.

Above described are examples of various compositions of this invention. In short, this invention theoretically completely differs from conventional methods in the solidification function of the chemical fluids used; and therefore it is a new and industrially very valuable invention which can subjugate in one action various difficulties arising from incapabilities in the control of the solidification speed of chemicals and the inaccuracies which were unavoidable in the conventional methods; and because it is, as already stated, not limited only to the strengthening of the ground, it has been developed to be used very effectively as a method of sealing-off of water from water-leaking portions of a building, as a method of constructing piles fixed in the ground such as an anchor or bearing piles, or as a construction method for underground structure, such as fluid-tight walls.

What is claimed is:

1. A composition for plugging formations in constructive works comprising a liquid organic isocyanate compound which, upon coming in contact with water, reacts therewith to produce a water-insoluble solidified substance while liberating carbon dioxide gas, a diluent for the isocyanate compound, and a surface active agent, which does not react with the isocyanate compound and which facilitates the association between the isocyanate compound and water and serves to improve the stability of foams formed by said isocyanate compound and the liberated carbon dioxide gas, the composition, when not in contact with water, not forming a chemically reactive system, wherein the diluent comprises a liquid organic silane derivative of the formula $R_n$—Si—$X_{(4-n)}$ in which R is selected from the group consisting of alkyl radicals and aryl radicals and X is selected from the group consisting of halogen atoms and alkoxy groups and wherein said diluent both dilutes said isocyanate compound and reacts with water to produce a water-insoluble solid substance.

2. The composition of claim 1, wherein said isocyanate compound is an isocyanate prepolymer and said diluent is tetramethoxysilane.

3. The composition of claim 1, wherein said isocyanate compound is an isocyanate prepolymer and said diluent is tetraethoxysilane.

4. The composition of claim 1, wherein the surface active agent is a silicone non-ionic active agent.

5. The composition of claim 1, wherein said diluent contains a fine-powdered carbide.

6. The composition of claim 5, wherein the fine-powdered carbide is magnesium carbide.

7. The composition of claim 5, wherein the fine-powdered carbide is calcium carbide.

References Cited

UNITED STATES PATENTS

| | | | |
|---|---|---|---|
| 3,367,892 | 2/1968 | Jorczak | 260—2.5 A |
| 3,534,000 | 10/1970 | Blanc | 260—37 N |
| 3,505,275 | 4/1970 | Sato | 260—37 N |
| 2,867,278 | 1/1959 | Mallory | 260—2.5 A |
| 3,643,741 | 2/1972 | Miranda | 166—295 |
| 3,637,019 | 1/1972 | Lee | 166—295 |
| 3,623,330 | 11/1971 | Nakade | 166—295 |
| 3,399,247 | 8/1968 | Windemuth | 260—824 R |
| 3,354,099 | 11/1967 | Stegeman | 260—2.5 AK |
| 3,211,675 | 10/1965 | Johnson | 260—2.5 AK |
| 3,055,426 | 9/1962 | Kerver | 166—293 |

FOREIGN PATENTS

| | | | |
|---|---|---|---|
| 1,192,864 | 5/1970 | Great Britain | 260—2.5 AK |
| 1,270,725 | 9/1959 | France | 260—2.5 S |

OTHER REFERENCES

"Urethane Notes"; Bulletin UC–8; Olin Chemicals; published February 1967; pp. 1 to 5.

DONALD E. CZAJA, Primary Examiner

C. W. IVY, Assistant Examiner

U.S. Cl. X.R.

166—293, 295; 260—2 S, 2.5 AE, 2.5 AK, 2.5 S, 37 N, 842